June 1, 1954          J. PERDUE          2,679,827

COMBINATION FLUID PRESSURE MOTOR AND SHOCK ABSORBER

Filed May 23, 1949          2 Sheets-Sheet 1

June 1, 1954  J. PERDUE  2,679,827
COMBINATION FLUID PRESSURE MOTOR AND SHOCK ABSORBER
Filed May 23, 1949  2 Sheets-Sheet 2

Patented June 1, 1954

2,679,827

UNITED STATES PATENT OFFICE 2,679,827

COMBINATION FLUID PRESSURE MOTOR AND SHOCK ABSORBER

Jack Perdue, Great Sankey, Warrington, England, assignor to Electro-Hydraulics Limited, Warrington, Lancashire, England, a company of Great Britain Application May 23, 1949, Serial No. 94,855

Claims priority, application Great Britain June 11, 1948

6 Claims. (Cl. 121—38)

This invention relates to fluid pressure operated devices for use in fluid pressure operated systems. Various fluid pressure operated systems are known which utilise both a shock absorber and a fluid pressure operated motor and as an example of one such system may be mentioned the system for actuating retractable undercarriages of aircraft. In such systems it is known to place the cylinders of these devices in parallel or in tandem and in some cases to use one cylinder both for the fluid motor and the shock absorber. In the latter case, the devices had to be separated by fluid tight means. It has also been understood that a saving in space, weight and machining time could be obtained if the fluid motor and the shock absorber could be integrated, but no acceptable solution has as yet been proposed.

It is the main object of this invention to provide a combined fluid motor and shock absorber in which the advantages of saving in space, weight and production time and cost are obtained.

According to the present invention a fluid pressure operated device includes a fluid motor and a shock absorber, one within the other, and each comprising a cylinder, piston and hollow piston rod, the hollow piston rod of the fluid motor comprising the shock absorber, or alternatively, the hollow piston rod of the shock absorber comprises the fluid motor.

Figure 1:
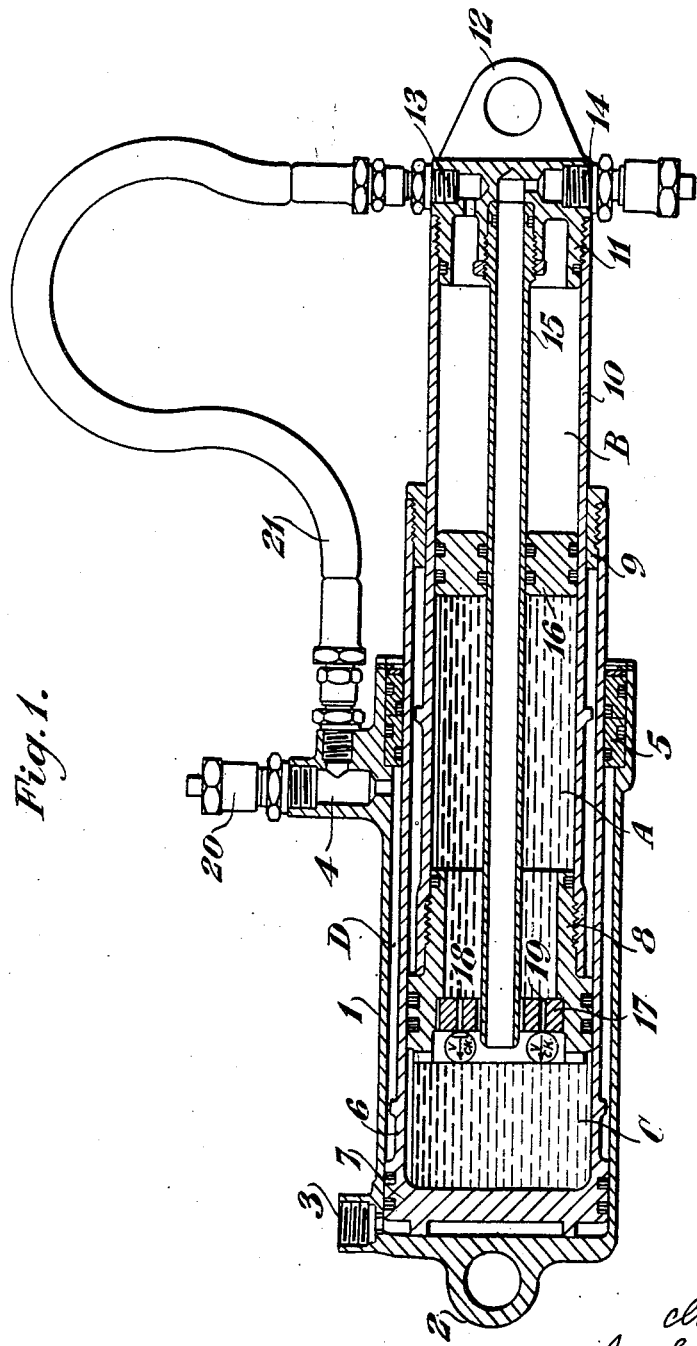
Figure 2:
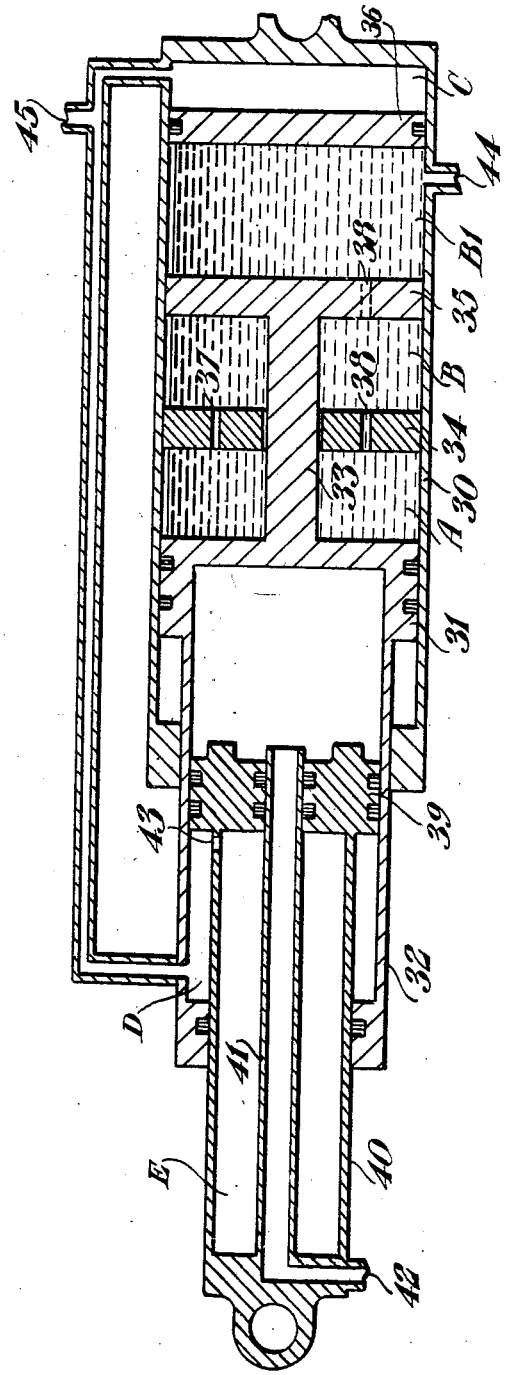

Two forms of the invention are diagrammatically illustrated in the accompanying drawings in which Figure 1 shows an arrangement in which the hollow piston of the fluid motor comprises the shock absorber whilst the alternative is shown in Figure 2.

Referring to Figure 1 the combined fluid motor and shock absorber comprises a fluid motor cylinder 1 closed at one end with an attachment lug 2 (for connection to one of the two relatively movable parts) and having two fluid connections 3, 4, the cylinder being closed at the other end by bushings 5 in which slides a hollow piston rod 6 terminating in a piston head 7 which slides in the bore of the cylinder. In the bore of the hollow piston rod 6 and a guide bushing 9 in the open end thereof, slides a piston 8 forming part of the shock absorber, which piston is in fixed connection by means of the screw threads shown with a hollow piston rod 10 which forms a cylinder to the other end of which is secured an end fitting 11 having a lug 12 (for connection to the other of the two relatively movable parts) and a fluid connection 13 leading into the bore of said cylinder formed by the piston rod 10. There is also a further fluid connection 14 which leads through a plunger rod or tube 15 arranged within the shock absorber cylinder, which passes through the shock absorber piston 8 to communicate with the bore of the hollow piston rod 6. In the shock absorber cylinder 10, a floating piston 16 slides on the said tube 15. The shock absorber piston 8 carries a damping head 17 for which purpose it is provided with two orifices 18, 19, one of which 18 is preferably valved. The floating piston 16 divides the shock absorber cylinder into two spaces A, B: the space A which communicates through the damping head with the hollow piston rod 6, is filled with oil, whilst the other space B is filled with air, through a suitable inflation aperture 20 and pipe line 21, communicating with the connection 13; the damping head 17 divides the space A from a space C on the annular side of the piston head 7.

The device as illustrated in the present application by way of example, may be conveniently used as the auxiliary shock absorber in the U. S. application of Neilson et al., Ser. No. 156,246, filed April 17, 1950, for Aircraft Landing Gear. The resilient part of the device would be employed when the under-carriage is lowered (on landing) and the fluid motor on retraction, in order to alter the angular position of a bogie of the landing gear with respect to the leg thereof, and reduce the space occupied by the undercarriage when retracted. In order to extend the fluid motor, fluid pressure is admitted into the fluid motor cylinder through the connection 3 to act on the full area of the piston head 7. The fluid motor piston 6—7 is thus moved to the right to extend the fluid motor carrying with it the shock absorber piston 8 and cylinder 10. To retract the fluid motor, pressure is admitted to the other side of the fluid motor piston so that the fluid motor can be retracted, if space D is not used as an additional air space for the shock absorber, as illustrated in Figure 1. In this case internal locks of known construction could be fitted in the fluid motor for the extended and closed position. The shock absorber functions in a known manner. Thus if a load is applied to the end lug 12 of the shock absorber cylinder, the shock absorber will close so that its piston 8 with its damping head 17 moves further into the piston rod 6, oil therein passing through the damping orifice 19 in the damping head to dissipate energy. The oil behind the damping head and in the shock absorber will at the same time act on the floating piston 16 in the shock absorber cylinder, thus compressing the air spring behind the floating piston in space B and storing energy. During extension of the shock absorber, oil in space A between the floating piston and damping head will return into the space C in the jack hollow piston rod, through the damping orifice 19 and a valved recoil orifice 18, the air spring in space B returning the floating piston to its original position. In order to maintain the fluid motor extended valved means may be provided to maintain the piston side of the fluid motor cylinder under pressure. Preferably, but not necessarily, an additional air space D is provided between the fluid motor cylinder and hollow piston rod, and when such space is provided it may be utilised for retraction of the fluid motor by a pressure source independent of the shock absorber.

In an alternative construction shown in Figure 2, there is provided a cylinder 30 in the bore of which slides a piston head 31 with a hollow piston rod 32 passing through an opening in the cylinder. The piston carries a counterpiston rod 33 sliding in a ported diaphragm 34 fixed in the cylinder, the counterpiston rod 33 terminating in a counterpiston 35 sliding in the bore of said cylinder in which also slides a floating piston 36. The diaphragm divides the cylinder into two oil spaces A, B, an additional oil space B₁ being provided between the counterpiston 35 and the floating piston 36, whilst the space between the floating piston 36 and the end of the cylinder forms an air space C, which is in communication with another air space D in the bore of the hollow piston rod 32. Apertures 37, 38 are provided respectively in the diaphragm and the counterpiston to allow the transfer of the shock absorber fluid from the space A to the space B and from there to the space B₁, and some or all of these apertures may be valved. In the bore of the hollow piston rod 32 slides the fluid motor piston 39 carried by a second hollow piston rod 40 through which passes a hollow plunger 41 which allows fluid to pass from a connection 42 to the bore of the shock absorber piston rod 32. The said piston rod 40 is formed with an aperture 43. 44 is an oil filling port and 45 an air inflation port, the conduit connecting said port and spaces C and D being flexible.

This system works as follows: When the shock absorber is closed, oil from the space A between the diaphragm 34 and the piston head 31 and from the space D₁ between the counter piston and floating piston will pass into the space B between the diaphragm and the counter piston, thus dissipating energy. At the same time the pressure of the oil acts on the floating piston 36 compressing the air spring in spaces C and D. When the shock absorber extends, the air spring will be restored and oil will flow from the space B between the diaphragm and the counter piston to the spaces A and B₁ between the counterpiston and floating piston, and diaphragm and piston head, through the apertures 37, 38, some of which can be valved, so that a larger passage is provided in one direction, preferably through the extension of the shock absorber. To extend the fluid motor, pressure is supplied at the connection 42 through the hollow plunger 41 into the bore of the hollow piston rod 32 of the shock absorber which comprises the motor cylinder and acts on the motor piston 39 to move it to the left and cause extension of the fluid motor. To retract the fluid motor, pressure such, for example, as air pressure, can be supplied to the underside of the fluid motor piston to cause the necessary retraction. Appropriate means may be provided to lock the fluid motor in the extended and/or closed position. It will be appreciated that in this arrangement the piston rod side of the motor is utilised as an air space D for the shock absorber, but it should be understood that it could be used for retraction of the motor if so desired. On the other hand a space in the fluid motor piston rod can be utilised as an additional air space E for the shock absorber, if required. It may be further explained that when fluid pressure is admitted at 42 the piston 31 and piston rod 32 will not move to the right as the fluid pressure admitted at 42 is not sufficient to compress the spring in space C. When fluid pressure admitted at 42 is connected to the tank or atmosphere, the air in space D or the load applied to the device will retract the jack piston 39, hollow piston rod 40, plunger 41 and its connection 42. The spring, that is to say the air pressure in space C, exerts a force to move parts 39, 31 and 33 to the left. The parts 31 and 32 will be moved up to the diaphragm 34 when a load is applied to the device, for example, when the associated aircraft lands or taxies on the ground.

Finally although the particular forms of the invention herein described have been referred to as comprising shock absorbers of the oleo-pneumatic type it is, of course, to be appreciated that it can be equally applicable to shock absorbers of any other known type, for example liquid spring type.

I claim:

1. A fluid pressure operated device having a power cylinder adapted for connection to one of two relatively movable parts, said power cylinder having a closed end and an open end, a piston head slidably disposed in said cylinder provided with a hollow rod having a peripheral space between the same and inner surface of said cylinder, said hollow rod closing said open end of said cylinder and in turn having an open end, a perforate shock absorber piston slidably disposed in said hollow rod including a hollow rod closing said open end of said first hollow rod and adapted for connection to the other of said two relatively movable parts, said second hollow rod having a central rod member carried by said second hollow rod, a floating piston disposed on said hollow rod member, means for the supply of fluid pressure to the space between said piston head and closed cylinder end, and means for supply and intercommunication of fluid pressure to and between said peripheral space and said second hollow rod at the side of the floating piston opposite to said perforate shock absorber piston.

2. A fluid pressure operated device having a power cylinder adapted for connection to one of two relatively movable parts, said power cylinder having a closed end and an open end, a piston head slidably disposed in said cylinder provided with a hollow rod having a peripheral space between the same and the inner surface of the cylinder, said hollow rod closing said open end of said cylinder and in turn having an open end, a perforate shock absorber piston slidably disposed in said hollow rod including a hollow rod closing said open end of said first hollow piston rod and adapted for connection to the other of said two relatively movable parts, said second hollow rod having a central plunger tube carried by said second hollow rod, a floating piston disposed on said central plunger tube, means for the supply of fluid pressure to the space between said piston head and closed cylinder end, means for the supply and intercommunication of fluid pressure to and between said peripheral space and said second hollow rod at the side of the floating piston opposite to said perforate shock absorber piston, and means for the supply of fluid pressure through said plunger tube to the space between the closed end of the power cylinder and said piston head.

3. A pressure fluid operated device having cylinders for connection to parts one of which moves relatively to the other, a hollow shock absorber at opposite ends in slidable telescopic relation to both cylinders, said shock absorber having a head, means for admission of pressure fluid into the interior of one of the cylinders to cause relative sliding between same and the shock absorber, the walls of one of said cylinders and shock absorber having a space therebetween, a fluid connection from the other cylinder to said space, the last-mentioned cylinder having a head opposed to the first-mentioned head and spaced from the other face of said floating piston to provide expansible chambers, cushioning liquid in said chambers, said second-mentioned head having restriction means to control the flow of said liquid for a cushioning action, and a floating piston in the last-mentioned cylinder subject at one face to the fluid of said connection.

4. A pressure fluid operated device comprising a cylinder having a floating piston therein; a cylinder in telescopic relation therewith having a head; means coacting with said head, said first cylinder and floating piston at one face of the latter providing expansible chambers in restricted communication and containing cushioning liquid; a hollow cylinder in telescopic relation to said second cylinder; the walls of said second cylinder and hollow cylinder having a space therebetween; and a fluid connection from said space to the first cylinder for contact of fluid with the other face of said floating piston.

5. A combined motor and shock absorber comprising a cylinder and a hollow piston rod adapted for connection to parts, one of which moves relatively to the other, a piston head on said rod having a fluid inlet passage therethrough, a hollow piston rod slidably telescoped with said cylinder and first piston rod, a space between said piston rods in which said pistonhead is exposed, said second piston rod including a piston head in said cylinder opposed to the first-mentioned piston head, a floating piston in said cylinder, cushioning liquid located in said cylinder between said floating piston and second-mentioned piston head, restricted passage means in said cylinder having damping coaction with said liquid, and a fluid connection to said space from the cylinder at the face of said floating piston opposite to said liquid.

6. A combined motor and shock absorber comprising a cylinder and a hollow piston rod adapted for connection to parts, one of which moves relatively to the other, a piston head on said rod having a fluid inlet passage therethrough, a hollow piston rod slidably telescoped with said cylinder and first piston rod, a space between said piston rods in which said pistonhead is exposed, said second piston rod including a piston head in said cylinder opposed to the first-mentioned piston head, a floating piston in said cylinder, a ported diaphragm in said cylinder between said second-mentioned piston head and floating piston, a counter piston rod extending from said piston head slidably through said ported diaphragm, a ported counter piston on said counter piston rod located between said diaphragm and floating piston, liquid occupying said cylinder between said second piston head and said floating piston, and a fluid connection to said space from the cylinder at the side of said floating piston opposite to said liquid.

References Cited in the file of this patent

UNITED STATES PATENTS

| Number | Name | Date |
|---|---|---|
| 501,426 | Kampf | July 11, 1893 |
| 789,566 | Riddell | May 9, 1905 |
| 850,583 | Howard | Apr. 16, 1907 |
| 1,131,344 | Dufour | Mar. 9, 1915 |
| 1,768,696 | Laddon | July 1, 1930 |
| 1,918,426 | Radnor | July 18, 1933 |
| 1,918,697 | Gruss | July 18, 1935 |
| 2,136,693 | Kniskern | Nov. 15, 1938 |
| 2,146,089 | Onions | Feb. 7, 1939 |
| 2,186,266 | Onions | Jan. 9, 1940 |
| 2,294,918 | Levy | Sept. 8, 1942 |
| 2,308,099 | Obecny | Jan. 12, 1943 |

FOREIGN PATENTS

| Number | Country | Date |
|---|---|---|
| 485,617 | Great Britain | May 16, 1938 |